United States Patent [19]

Harvey et al.

[11] 4,208,117
[45] Jun. 17, 1980

[54] FILM PACKET

[75] Inventors: Frederick W. Harvey, Webster; Gurdip S. Sethi, Rochester, both of N.Y.

[73] Assignee: Eastman Kodak Company, Rochester, N.Y.

[21] Appl. No.: 948,367

[22] Filed: Oct. 4, 1978

[51] Int. Cl.² ............................................. G03B 17/26
[52] U.S. Cl. ..................................... 354/275; 206/444; 206/620; 206/627; 354/121
[58] Field of Search ................ 354/121, 275, 276–278, 354/281, 283, 284; 352/72, 102, 103; 206/578, 316, 444, 620, 626, 627; 29/426, 427; 225/2, 40

[56] References Cited

U.S. PATENT DOCUMENTS

| | | | |
|---|---|---|---|
| 1,563,551 | 12/1925 | Bulask | 352/103 |
| 3,429,042 | 2/1969 | Lawrence et al. | 83/456 |
| 3,593,635 | 7/1971 | Servetnick . | |
| 4,152,739 | 5/1979 | De Moss et al. | 360/98 |

FOREIGN PATENT DOCUMENTS 404515  1/1934  United Kingdom ..................... 206/620

OTHER PUBLICATIONS

*Research Disclosure,* vol. 172, Pul. No. 17299, p. 38, Pul. No. 17297, p. 82, Aug. 1978.

*Primary Examiner*—John Gonzales
*Attorney, Agent, or Firm*—J. A. Matthews

[57] ABSTRACT

A photographic cartridge assembly includes a photosensitive film disk rotatably received between opposed parallel walls of a thin cartridge casing. The casing is adapted to be opened, to release the disk for processing and printing, by prying the casing apart until it fractures at one edge and then tearing the casing from the fracture toward the opposite edge. In order to insure that the resulting opening is at a predetermined location in the casing, and is large enough to remove the disk, channels are provided in a casing wall to lead the tear along two paths extending oppositely around the periphery of the disk from the one edge to the opposite edge.

8 Claims, 10 Drawing Figures

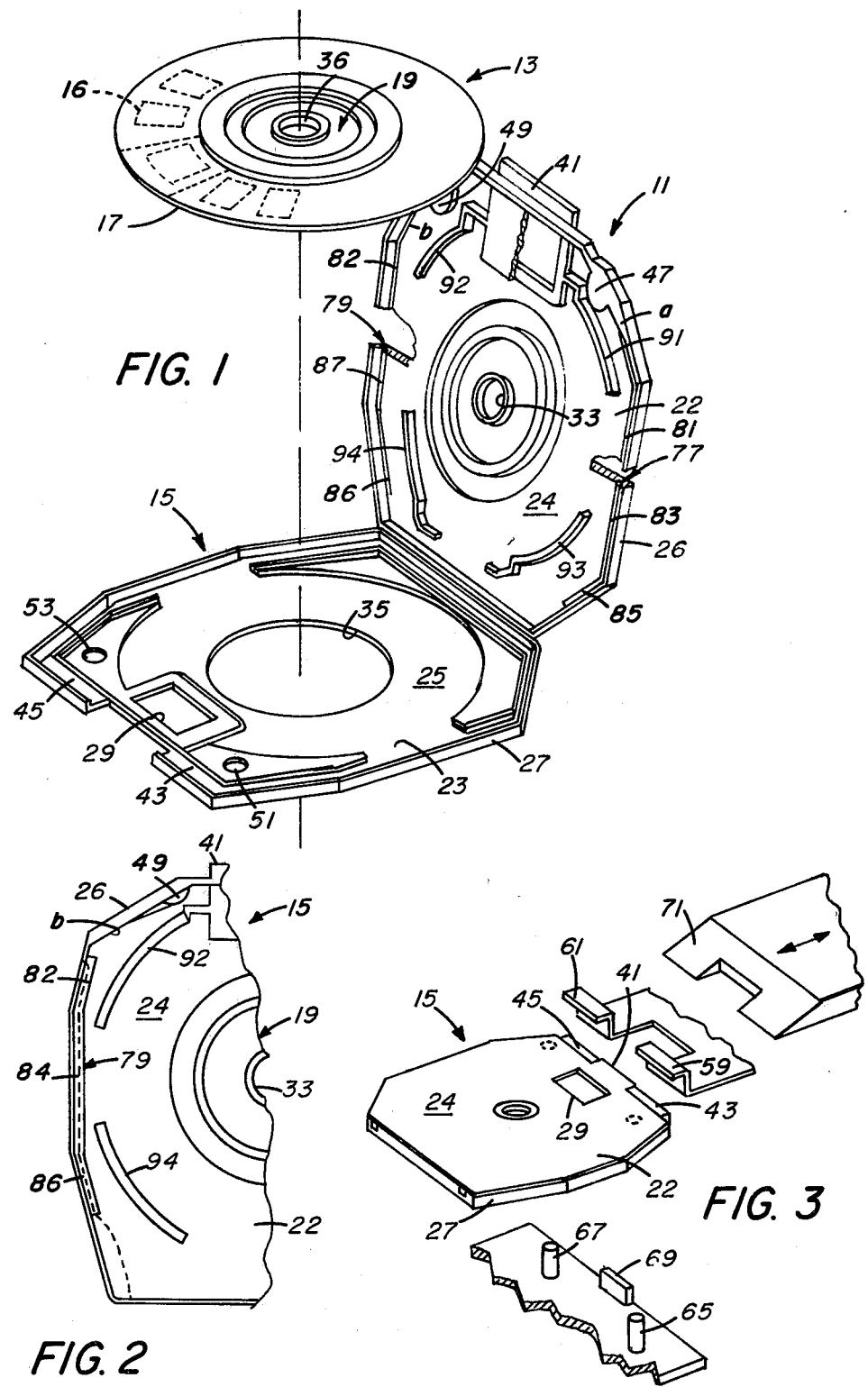

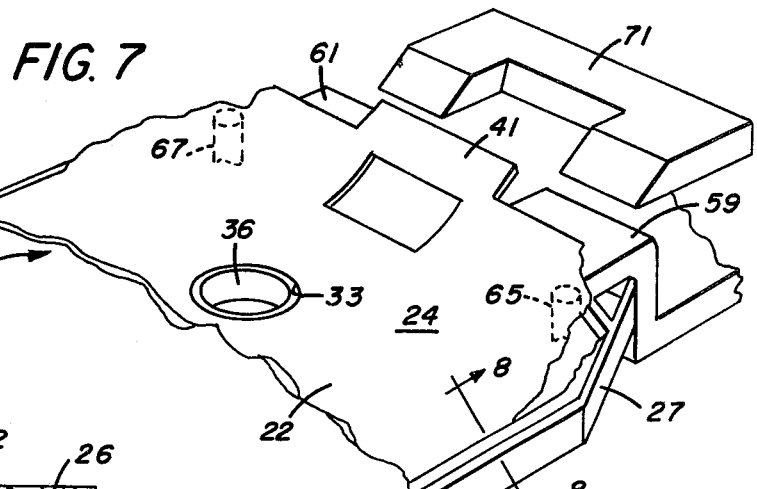
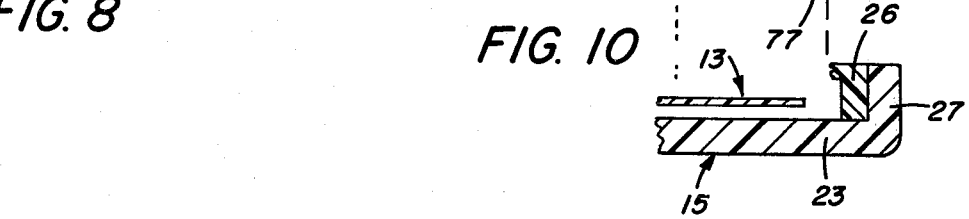
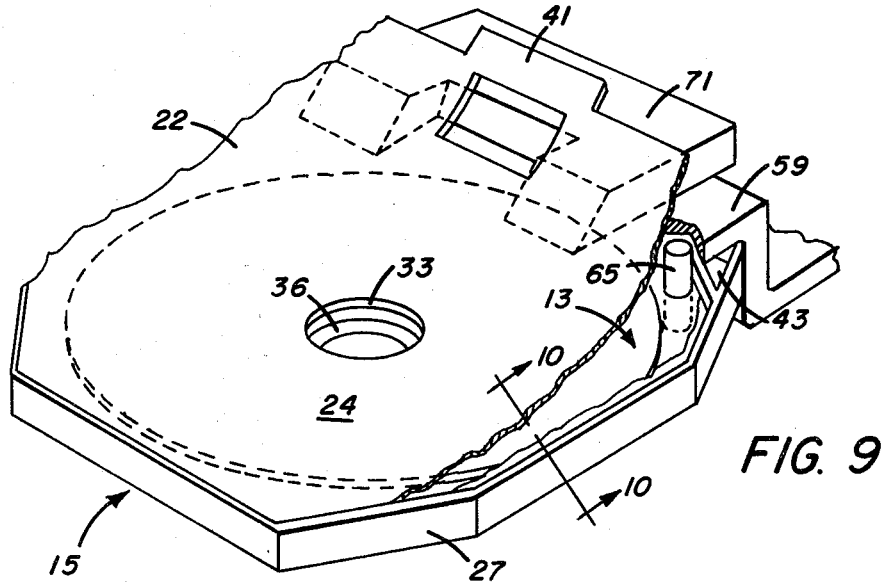

FILM PACKET

CROSS-REFERENCE TO RELATED APPLICATIONS

Reference is made to commonly-assigned copending U.S. patent application Ser. No. 945,166 entitled METHOD AND APPARATUS FOR OPENING A FILM CARTRIDGE, filed in the name of John E. Morse on Sept. 25, 1978.

BACKGROUND OF THE INVENTION

1. Field of the Invention

The present invention relates to cartridge assemblies suitable for convenient use with cooperative camera apparatus. More specifically the invention relates to such cartridge assemblies including film in a disk format and to means for facilitating opening of the assemblies to remove the film disk, such as for processing and printing.

2. Description of the Prior Art

Film Packages

It is well known to package photographic film in a protective casing. Perhaps the most notable examples are the commercially available size 126 and 110 roll-film cartridges, and the size 135 roll-film magazines.

More recently proposed examples are described in copending U.S. patent applications Ser. No. 774,716, entitled PHOTOGRAPHIC FILM UNIT AND CARTRIDGE ASSEMBLY, filed on Mar. 7, 1977, in the name of Donald M. Harvey; and Ser. No. 931,053, entitled PHOTOGRAPHIC FILM CARTRIDGE ASSEMBLY AND CAMERA, filed on Aug. 4, 1978 in the name of Gurdip S. Sethi. These applications disclose generally flat film packages including a film disk rotatably received between opposed, generally parallel walls of a thin cartridge casing. Some versions are constructed of paper, while others are plastic. The preferred embodiment of the present invention will be described and illustrated in connection with cartridge casings and assemblies of the general type disclosed in these applications.

Film Package Openers

Most of the film packages mentioned above are designed to withstand considerable abuse by amateur photographers. While the external wrappings are easily removed for camera loading, the cartridge casing discourages access to the film except by the appropriate camera structure. Photofinishers and others who must separate the film from its casing, such as for processing and printing, use suitable devices to break open the casing or pull the film from it.

Numerous types of openers are described in the patent literature. In U.S. Pat. No. 3,265,263, issued on Aug. 9, 1966, a proposed opening device initiates a crack in one end of a super 8 cartridge housing and then causes the crack to propagate across the housing until it is sufficiently broken to remove the film. U.S. Pat. No. 3,580,443, issued on May 25, 1971, describes a somewhat similar approach for size 126 film housings. In U.S. Pat. No. 3,550,877, movie film is unwound from a spool in a cartridge by pulling the film through the exposure aperture after first disabling an anti-backup mechanism. Weakened portions appropriately located in the cartridge facilitate its puncture by the disabling device. And, in U.S. Pat. No. 3,621,993, issued on Nov. 23, 1971, an x-ray package is disclosed that includes an envelope having a weakened line to insure clean tearing for removal of the film.

The preferred embodiment of the present invention will be described and illustrated in connection with an opening device of the type proposed in cross-referenced Morse Application, Ser. No. 945,166. Such an opener has particular utility with disk film formats, and is intended to pry a thin cartridge casing apart from one edge, until it fractures, and then tear the casing from the fracture toward the opposite edge.

While many of the prior art devices offer desirable features, it will become apparent from the following specification that they lack the significant advantages presented by the present invention. In most cases, for example, prior openers are not entirely suitable for thin cartridge casings containing film in a disk format. In other cases, it is difficult to automate certain film-handling operations subsequent to opening the casing, because of uncertainty in the location or configuration of the opening. In still other cases, the opening may not be large enough or appropriately shaped to permit removal of the film in the desired direction, e.g. normal to the plane of the film.

SUMMARY OF THE INVENTION

In accordance with the present invention, a thin cartridge assembly, which includes a disk of photosensitive film, and which is adapted to be opened to release the disk by tearing the assembly apart from one edge to its opposite edge, is provided with means for leading the tear along two paths extending oppositely around the periphery of the disk. The cartridge section between the two paths is removed by such tearing, is at least as large as the disk, and is shaped to facilitate removal of the disk from the assembly.

More specifically, in accordance with the presently preferred embodiment, the cartridge assembly is layered in construction, including parallel first and second opposed casing walls, with the film disk sandwiched therebetween. The walls include an outer annular section beyond the periphery of the disk, and the opposed paths are defined by curved channels located in one of the walls in this annular section. The tearing is caused to propagate along the channels by grooves that weaken or concentrate stress in the one cartridge wall, and by ribs, including the outermost rim of the casing, on opposite sides of the grooves.

BRIEF DESCRIPTION OF THE DRAWINGS

FIG. 1 is a perspective view of the cartridge, prior to assembly, with the film disk removed;

FIG. 2 is a partial plan view of one wall of the cartridge casing with a dotted line depicting a typical path along which the casing might be torn to remove the film disk;

FIG. 3 is an exploded perspective view depicting apparatus for tearing the casing of FIG. 1 open to remove the disk;

FIG. 7 is a perspective view, corresponding to FIG. 5, illustrating the casing when it is first fractured by the opening apparatus;

FIG. 8 is a partial sectional view taken along line 8—8 in FIG. 7 depicting the groove prior to tearing;

FIG. 9 is a perspective view corresponding to FIG. 6, illustrating the casing partly torn open by the apparatus of FIG. 3; and FIG. 10 is a partial sectional view taken along line 10—10 in FIG. 9 depicting the groove subsequent to tearing.

DESCRIPTION OF THE PRESENTLY PREFERRED EMBODIMENT

Figure 4:
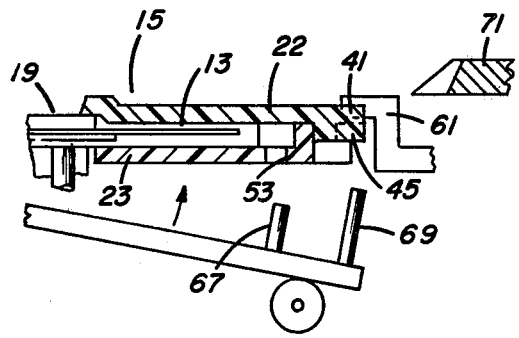
FIGS. 4–6 are partial cross-sectional views of the cartridge casing and apparatus of FIGS. 1 and 4, depicting successive steps in the operation of the apparatus.

Film disks, and cartridge assemblies for enclosing the same, are fully disclosed in the previously-mentioned U.S. patent applicaton Ser. No. 774,716; and in commonly assigned, copending U.S. patent application Ser. No. 931,053, entitled PHOTOGRAPHIC FILM CARTRIDGE ASSEMBLY, filed on Aug. 4, 1978 in the name of Gurdip S. Sethi. The disclosure of the last-mentioned application is incorporated by reference into this description, so that the remainder of the description can be directed more particularly to elements forming part of or cooperating directly with the present invention.

Referring now to FIG. 1, the preferred embodiment is depicted as comprising a thin, generally flat cartridge assembly 11 including a film disk 13 and protective casing 15.

The film disk is a flat sheet of moderately-flexible, but self-supporting material, coated with suitable photosensitive layers for recording latent images. Although the images can be located on the disk in a number of different orientations, in the preferred embodiment a plurality of image areas 16 are circularly disposed between the outer disk periphery 17 and a centrally located hub 19.

The cartridge casing 15 includes two parts 22 and 23, having respective, somewhat planar wall portions 24 and 25, surrounded by respective generally circular (e.g. hexagonal) peripheral rims 26 and 27. FIG. 1 depicts the parts in an opened condition, with the film disk removed, but it should be understood that the casing is intended to enclose the disk to protect it both physically and photographically. In the closed condition, the respective rims of the casing parts engage one another radially-outwardly of the film disk, to define the casing rim, while the walls of the parts are spaced apart to define a parallel layered construction (see FIG. 4) with the disk rotatably sandwiched between the respective casing walls.

The casing provides a relatively secure housing for the film disk to discourage tampering by the amateur photographer. At the same time, however, the casing allows for convenient access to the disk by cooperating camera mechanisms, and for removal of the disk from the casing by the photofinisher.

Film-disk security is provided by joining the cartridge parts together at rims 26 and 27, such as by ultrasonic welding.

Camera access is through an exposure aperture 29, and centrally aligned indexing apertures 33 and 35. By engaging the hub of the film disk through the indexing apertures, the disk can be rotated on an axis passing through the center 36 of the hub, to position respective image frames relative to the exposure aperture. Of course, suitable light shields should be included to prevent fogging of the film through these apertures. Again, however, such details are not directly pertinent to the present invention, and can be better understood by referring to the previously mentioned U.S. application Ser. No. 931,053 (entitled PHOTOGRAPHIC FILM CARTRIDGE ASSEMBLY, filed on Aug. 4, 1978 in the name of Gurdip S. Sethi).

Removal of the disk for processing and printing is accomplished, for example, by prying the casing apart at one edge, until it fractures, and then rending or tearing the casing from the initial fracture to its opposite edge. As previously mentioned, features of the cartridge casing and assembly which facilitate this approach, as well as an opening device to bring it about, are illustrated and described more fully in the cross-referenced Morse application Ser. No. 945,166. Briefly, however, as background pertinent to the present invention, the cartridge casing includes two opening mechanisms that cooperate with each other and the opening device. First, one cartridge part 22 includes a lip 41 that extends outwardly from rim 26 at the one edge of the casing, while the other cartridge part includes two similar but offset lips 43 and 45, spaced circumferentially on opposite sides of the lip 41. Second, one cartridge part includes pads 47 and 49, adjacent the rim 26 at the same edge of the casing as lip 41, while the other cartridge part includes apertures 51 and 53, which provide access to the pads from the other side of the casing.

Figure 5:
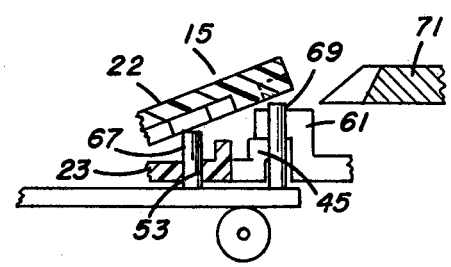
Figure 6:
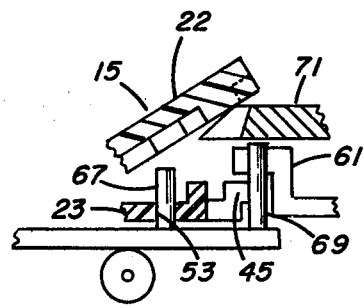

The opening device, depicted in FIGS. 3-6, is adapted to receive the casing with the offset lips 43 and 45 engaged under correspondingly offset ledges 59 and 61 (FIG. 3). With the second part of the casing so held in a stationary position, lever arm 63 carrying pins 65 and 67, and abutment 69, is moved into engagement with the first casing part (FIG. 4). The pins 65 and 67 engage the pads 47 and 49, through apertures 51 and 53, while the abutment 69 engages lip 41. The lever arm is then forced against the first part until the casing fractures and begins to tear (FIGS. 5 and 7). Next, a wedge 71 is moved between the fractured parts, causing the initial fracture to propagate across the casing (FIGS. 6 and 9) to its opposite edge, and thereby removing a section of the casing through which the disk is accessible.

Referring now more specifically to the invention in its presently preferred embodiment, the cartridge casing and assembly are provided with means for predetermining the location and shape of the removed section by leading, directing, or otherwise causing the tear to propagate, from the first fractures, along two paths that extend oppositely around the periphery of the disk. While the exact location of the paths is not determined, they will essentially always be confined to relatively narrow curved channels between the periphery of the disk and the rim of the casing, most likely adjacent the rim.

The channels are defined primarily by two substantially similar grooves 77 and 79, on opposite sides of the first casing part, respectively. They extend adjacent rim 26 from one edge of the casing toward its opposite edge; from first end portions 81 and 82, outwardly away from each other to central portions 83 and 84, and then back toward each other at trailing end portions 85 and 86. Although in each channel each respective portion individually is straight, together the channel portions define a path that curves around the film disk, radially beyond the periphery of the disk. Thus, the distance between each groove increases and then decreases to bound a central wall section, between the grooves, that, when detached from the rest of the casing, provides an opening of sufficient size and appropriate configuration to permit removal of the film disk in a direction parallel to its axis of rotation.

When the cartridge assembly is placed in an opening device of the general type described above, and is pried apart at one edge, it almost always will fracture at two approximate locations labeled "a" and "b" in FIG. 1. The first end portions 81 and 82 of the grooves extend adjacent the same locations to intercept propagation of the fractures and lead further tearing along the grooves on the opposite sides of the film disk. The grooves are terminated at ends 85 and 86, since the tears have by then nearly cleared the film disk, and the direction of their further propagation is less critical.

In the preferred embodiment, the grooves are of uniform depth extending about halfway through the casing wall from one face thereof, as depicted in FIG. 8. It should be apparent, however, that shallower grooves might be placed in opposition on both faces of the wall.

Although the grooves are the primary mechanism defining the tear channels, strengthening elements also straddle each groove to redirect any tears that may wander therefrom. Such strengthening elements include the casing rim 26 and ribs 91, 92, 93, and 94. Like the grooves, ribs 91 and 93, on one side of the casing, are substantially similar to ribs 92 and 94 on the other side. The ribs 91 and 92 are positioned primarily to intercept tears that otherwise would miss the grooves from the beginning, while ribs 93 and 94 will intercept tears that propagate toward the film disk from the trailing ends of the grooves.

Referring now to the operation of the preferred embodiment, and to FIGS. 3, 7 and 9, ad the casing is pried apart by the opening device, wall 24 ordinarily will fracture at locations "a" and "b." Then, as the wedge is moved between the fractured parts, the tears will progress along the two grooves from the initial fractures to the opposite edge of the casing. If the initial fractures occur closer to lip 41, or stray from either of the grooves, they will be redirected to the desired path by the ribs 91 and 92. Similarly, if the tears should propagate inwardly from the trailing end portions of the grooves, the ribs 93 and 94 will block the tears from the vicinity of the film disk. The central section of the casing wall, between the grooves, is then detached from the rest of the casing to present the film disk for removal.

It should now be apparent that the structure of the present invention provides significant advantages not available from the teaching of the prior art. The casing can be welded tightly shut to protect the film and facilitate its intended use in photographic cameras, yet it can be opened reliably in a predictable manner by the film processor. When the casing is opened, as described, it will tear in a predetermined manner along two paths such that, when the intermediate section is detached, the resulting opening will be large enough and appropriately shaped to remove the film disk in a direction normal to its flat dimension. Similarly, the opening will be located in a known side of the casing, from which appropriate apparatus can be positioned to receive the disk from the casing either manually or automatically.

The invention has been described in detail with particular reference to an illustrative preferred embodiment thereof, but it should be understood that variations and modifications can be effected within the spirit and scope of the invention as described hereinabove and as defined in the appended claims.

We claim:

1. A thin cartridge assembly including a disk of photosensitive film and a casing enclosing the disk, which casing is adapted to be opened to provide access to the disk by prying the casing apart from one edge and tearing the casing to its opposite edge; said cartridge assembly comprising:
   a plastic casing wall including a central section superposed closely adjacent to said disk and an outer annular section extending around the periphery of the disk radially outwardly therefrom; and
   means including grooves in said annular section for leading tearing of said casing along two paths extending oppositely around the periphery of said disk from the one casing edge to its opposite edge.

2. A thin, photographic cartridge assembly including a photsensitive disk and a generally flat plastic casing enclosing the disk, the casing including means for facilitating its opening by cleaving the casing apart from one edge and splitting the casing toward its opposite edge; said cartridge assembly comprising:
   a casing wall parallel to said disk, said wall including an annular section extending radially outwardly beyond the disk periphery; and
   means defining two channels in said annular section on opposite sides of said disk for leading the splitting of said casing around said disk from the one casing edge toward its opposite edge, said channels being spaced from each other by a distance which first increases and then decreases from the one edge toward the opposite edge.

3. A cartridge assembly as set forth in claim 2, wherein said channels each include a groove of reduced thickness in said casing wall, and wherein each said groove is bounded by at least one rib of increased thickness in said casing wall.

4. A cartridge assembly for enclosing a disk of photographic film and including a thin, opaque casing adapted to be opened by tearing the casing from one edge to its opposite edge; said cartridge assembly comprising:
   opposed first and second plastic casing parts enclosing the film disk therebetween;
   means including a rim radially outside of the disk periphery for coupling said first and second parts together; and
   means defining channels for confining the tearing of said casing to said first casing part between the disk and said rim, said channels extending in two paths respectively from the first edge oppositely around the periphery of the disk to the opposite edge.

5. A cartridge assembly as set forth in claim 4 wherein said first channels include grooves respectively in said first part adjacent said rim.

6. A casing for enclosing a disk of photographic film, and adapted to be opened to release the disk by tearing the casing apart from one edge toward its opposite edge; said casing comprising:
   a tearable casing wall including a generally circular central section adapted to be superposed in closely spaced relationship with said film disk, and an annular outer section adapted to extend radially outwardly beyond the periphery of the film disk; and
   p1 means defining two channels entirely in said annular outer secton of said casing wall and extending oppositely around the central section for directing tearing of said casing around the disk from the one casing edge toward the opposite casing edge.

7. A thin, generally flat casing for enclosing a disk of photographic film, and adapted to be opened to release the film disk by prying the casing apart from one edge and tearing the casing to its opposite edge; said casing comprising:

a casing wall including a generally circular central section adapted to be superposed with said film disk, and an annular outer section adapted to extend radially outwardly beyond the periphery of the film disk; and means including grooves in said annular outer section of said casing wall, extending in two paths respectively oppositely around the central section, for leading tearing of said casing around the disk from the one casing edge toward its opposite edge.

8. A casing for enclosing a disk of photographic film, and adapted to be opened to release the film disk by prying the casing apart from one edge until it fractures, and tearing the casings from the fracture to the opposite edge; said casing comprising:

a tearable casing wall including a generally circular central section adapted to be superposed in closely spaced relationship with said film disk, and an annular outer section adapted to extend radially outwardly beyond the periphery of the film disk; and means including grooves extending in said annular outer section oppositely around the central section, and strengthening elements on opposite sides of said grooves, for directing tearing of said casing around the disk from the one casing edge toward its opposite edge.

* * * * *